S. G. BRYER.
Rock-Drilling Machine.

No. 207,162. Patented Aug. 20, 1878.

WITNESSES.
Bill Wooster
E. W. Newton

INVENTOR.
Samuel G. Bryer
By his attorney
A. L. Newton

UNITED STATES PATENT OFFICE.

SAMUEL G. BRYER, OF SAUGUS, MASSACHUSETTS.

IMPROVEMENT IN ROCK-DRILLING MACHINES.

Specification forming part of Letters Patent No. 207,162, dated August 20, 1878; application filed April 18, 1878.

*To all whom it may concern:*

Be it known that I, SAMUEL G. BRYER, of Saugus, in the county of Essex and State of Massachusetts, have invented an Improved Rock-Drilling Machine, of which the following is a specification:

The invention relates to a rock-drilling machine the motive power of which is steam or air.

I make no claim upon the support of the machine, using either a tripod or column, or any other suitable support. Neither do I have or describe a new drill, or new mode of fastening the drill to the piston-rod; but I may use any suitable or convenient devices for these parts of a complete machine.

My invention relates, particularly, to the form of the piston, to the cylinder, and to the ports and channels in the cylinder, by which, when actuated by suitable power, the reciprocating motion of the piston lets in and cuts off the motive power, steam or air, and opens and closes exhaust-ports without the aid of valves.

The invention also relates, particularly, to the devices for rotating the piston carrying the drill, consisting of a rotating bar inserted into the upper end of the piston, with devices for rotating said bar; all of which I will proceed to explain, in order that others skilled in mechanics may understand the construction and operation of my machine.

Figure 1:
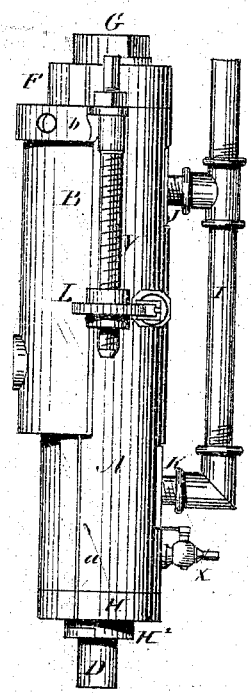
Figure 2:
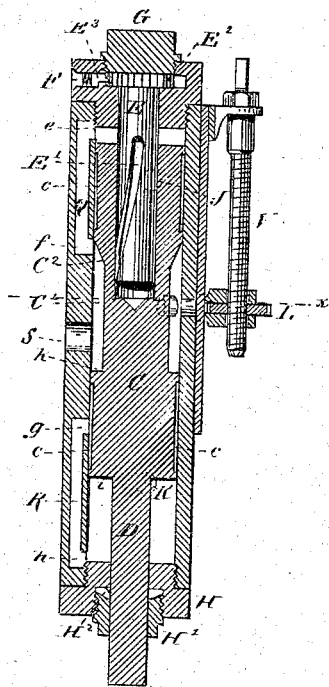
Figure 3:
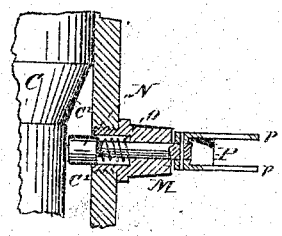
Figure 4:
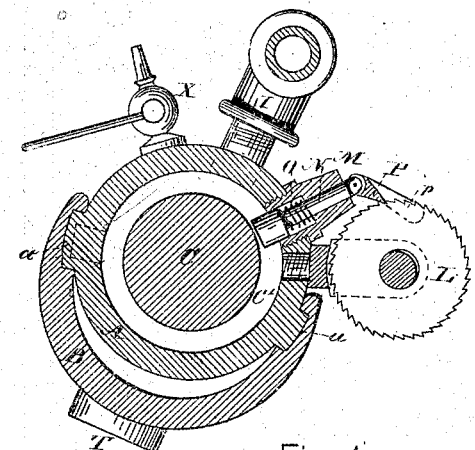

In the accompanying drawings, which are made a part of this specification, Figure 1 is an elevation of that part of the machine herein particularly described. Fig. 2 is a vertical section of the same. Fig. 3 is a section of a portion of the cylinder, showing a part of the piston and the feed-pin in contact with the piston; and Fig. 4 is a horizontal section of the machine on the line $x\ x$ of Fig. 2.

The letter A represents the cylinder, which is shown partly in all of said figures. In the inside of its upper and lower ends screw-threads are cut, into which caps or stoppers are screwed after the piston is inserted and when the machine is being made ready for operation.

B is a semi-cylindrical frame. (Shown particularly in Figs. 1 and 4.) The frame is secured to a tripod or other support at T. The upper part has attached to it an arm, $b$, having an opening, through which passes a screw, V, as shown in Figs. 1 and 2. Into the inner surface of said frame, near its outer edges, are cut grooves, and in these grooves run ways $a\ a$ on the cylinder, (shown in Figs. 1 and 4,) so that while the frame remains stationary the cylinder is moved up and down, held by its ways in said grooves.

C represents a piston, the shape of which is seen most fully in the section, Fig. 2. Into its upper end is inserted rotating bar E. Its upper and lower parts fit closely in the cylinder.

At $c\ c\ c\ c$, Fig. 2, is seen annular grooves, encircling the piston; and it will be observed that, as, for instance, when the stroke is downward and the groove $c\ c$ in the upper part of the piston reaches the exhaust-port J, steam will escape from the channel Q into said upper groove $c\ c$ and through said port J, thereby relieving the back-pressure of steam at the lower end of the cylinder; and so, on the piston's return, when the lower groove $c\ c$ reaches the exhaust-port K, steam will escape from the channel R into the said lower groove $c\ c$, and through said port K, thereby relieving the back-pressure in the lower end of the cylinder; and experiment has shown that no machine operated in this way can work successfully without such provision for the back-pressure.

At the middle portion of the piston is a broad groove, $C^1$, whose upper edge, $C^2$, is beveled. This groove is twice the length of the stroke.

At the lower end of the piston is the piston-rod D, to which is attached the drill.

E represents the rotary bar, and has cut in it a spiral groove, $E^1$, in which groove is placed a pin, which projects into a hole in the cylinder. (Not shown in the drawings.)

On the upper end of the rotating bar is a ratchet-wheel, $E^2$, and pin or pawl $E^3$. By the bar E the drill is rotated. As the bar goes into the upper end of the piston, the pin fitting into the spiral groove, the piston, in its downward stroke, throws the rotating bar, and is held in position by the ratchet $E^2$, and the said ratchet is held by the pin E³ in the cylinder, operated by a spiral spring around it, as shown in said Fig. 2.

F represents the head or upper end of the cylinder, and into its top screws the nut G, which fits closely upon the ratchet-wheel E².

H represents the lower end of the cylinder, into which screws the nut H¹, and between which and the said head H is packing H², and through both of which passes the piston-rod.

I represents an exhaust pipe or tube, through which passes off steam from the exhaust-ports J and K.

L represents a ratchet-wheel. (Particularly shown in Figs. 1 and 4.) Through its center a hole is made, and screw-threads are cut in the same, and through which passes the feed-screw V. The said ratchet-wheel plays between two arms, secured to the cylinder by a pin or bolt, as shown fully in Fig. 4. The said ratchet-wheel is operated by the pawl P, having arms falling on either side of the ratchet, and said pawl hinges on the end of the feed-pin N, which passes through a short tube, M, into the cylinder, as shown in Figs. 2, 3, and 4.

The bevel C² on the upper side of the groove C¹ in the piston, in the downward stroke of the piston, strikes the feed-pin and drives it outward. This engages the pawl with the ratchet-wheel, which rotates upon the feed-screw V, and thus moves or advances the cylinder. The feed-pin, pushed outward, is thrown back into position by a spiral spring around it. (Marked O.) If the rock is hard, the pin is pushed outward slightly. If the rock is soft, the pin is pushed outward farther, and correspondingly moves forward or rotates the ratchet, and thus advances the cylinder and drill just so far toward its work.

Q represents a channel in the upper part of the cylinder, and R a like channel in the lower part of the cylinder, both ends of which channels terminate within the hollow of the cylinder, as shown in Fig. 2 at the letters $e, f, g,$ and $h$.

S represents an orifice for letting in steam or the motive power within the hollow of the cylinder.

Having described and pointed out the various parts and devices in the make-up of my machine, as shown in the drawings, I will now explain the mode of operating the same, without, of course, explaining the support or the drill of the drilling-machine.

Suppose the piston is in the position shown in Fig. 2, the steam is admitted into the cylinder through the port S and fills the groove C¹ in the piston. The steam cannot escape downward; but, the ports $f$ and $e$ being open, it rushes up and fills the space between the head of the cylinder and the upper end of the piston. The pressure and expansion of the steam drives the piston downward until the lower shoulder, $k$, of the groove reaches the port $g$, when the steam rushes into and through the channel R and the port $h$ into and fills the space within the cylinder between its head H and the shoulder $i$ of the piston. The ports $e$ and $f$ are closed at the same time, and the exhaust-port J is unclosed and the steam escapes; but the steam let into the described space at the lower end of the cylinder by its pressure and expansion drives the piston back to its first position, uncovering the exhaust-port K, and allowing the steam to rush in and fill the upper space of the cylinder again, and thus the cause of the upward and downward motion of the piston is explained, and the piston, formed as described, lets in and cuts off the steam and opens and closes the exhaust-ports without the aid of valves.

In order to give a rotary or lateral motion to the piston, and so to the drill, that the rock may be operated upon evenly at the same time the piston descends, a pin in the opening near the top of the piston, fitting into the spiral groove E¹, follows the groove downward in its spiral course. On the upward or return movement of the piston, the ratchet-wheel E² and pin E³ prevents the piston from returning to its former position, and in this way the revolution of the drill is effected and made constant in its revolution.

Thus it will be perceived that a rock-drilling machine provided with a cylinder and piston constructed as herein shown is really simple in construction, and is not likely to get out of order. It can be made shorter than any other now in use, and with great power, and is less expensive from its simplicity.

I am aware that in this class of inventions a large number of patents have been issued, and it will be of little consequence to give a description of them, or show wherein my invention differs from the same.

I therefore claim as my invention and desire to secure by Letters Patent—

1. In a rock-drilling machine, the combination of the piston C, which has a broad annular groove about its central part, the upper side of which is beveled, and annular grooves $c\ c\ c\ c$, which are placed midway, respectively, between the upper and lower ends of the piston and the said broad groove, and the cylinder A, which is provided with the inlet-ports S, $e$ and $f$, $g$ and $h$ and the exhaust-ports J and K and the channels Q and R, substantially in the manner and for the purpose shown and described.

2. The combination of the piston C, the rotary bar E, having a spiral groove, E¹, in which is received a pin fastened to the piston, the ratchet E² and the pawl E³, the head of the cylinder F, and the nut G, substantially as shown, and for the purpose described.

SAMUEL G. BRYER.

Witnesses:
J. L. NEWTON,
P. W. WESTERMANN.